F. O. KEIFER.
DENTAL APPLIANCE.
APPLICATION FILED MAY 7, 1912.
1,050,469. Patented Jan. 14, 1913.
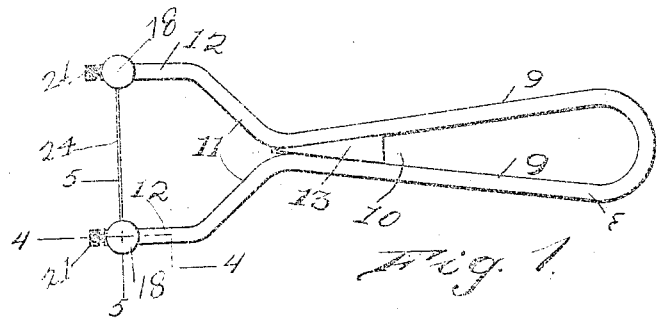
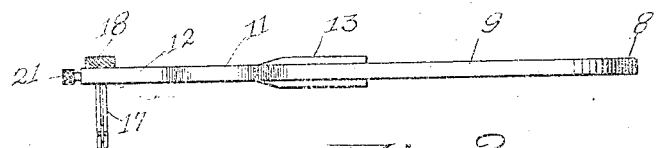
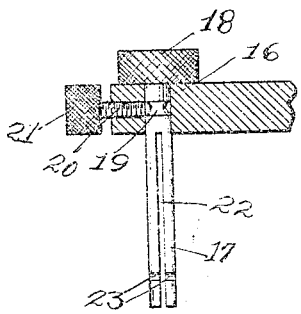 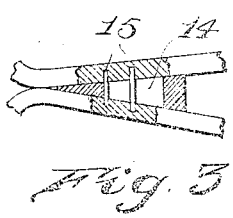 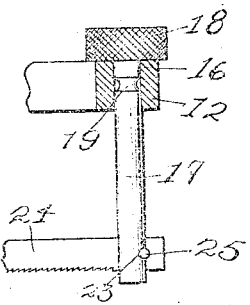
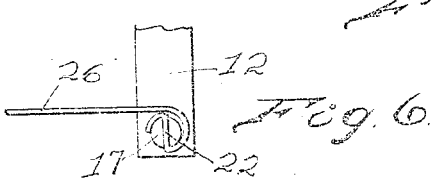
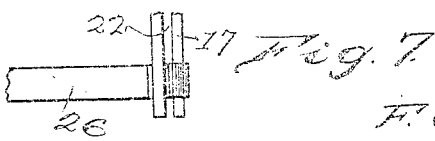
Inventor
F. O. Keifer

UNITED STATES PATENT OFFICE.

FOREST O. KEIFER, OF ELK CITY, OKLAHOMA.

DENTAL APPLIANCE.

1,050,469.  Specification of Letters Patent.  Patented Jan. 14, 1913.

Application filed May 7, 1912. Serial No. 695,769.

*To all whom it may concern:*

Be it known that I, FOREST O. KEIFER, a citizen of the United States, residing at Elk City, in the county of Beckham and State of Oklahoma, have invented certain new and useful Improvements in Dental Appliances, of which the following is a specification.

The present invention relates to a novel appliance for holding an instrument adapted for use in connection with dental work.

An important object of this invention is to provide an appliance of the above mentioned character which is adapted to hold one of a number of instruments in a proper manner for its best use and at the same time permit of the ready removal of this instrument and the substitution therefor of another instrument.

A further object of my invention is to provide an appliance to be held in the hand of the user and manually operated, and which is constructed to hold an instrument, such as a saw, strip of sand paper, rubber band or the like, in a proper stretched condition so that it may be more advantageously employed in the work for which it is intended.

A further object of my invention is to provide novel means for spreading the instrument-holding parts of the appliance for regulating the tension placed on the instrument.

A further object of the invention is to provide an appliance of the above mentioned character which is simple in construction, cheap to manufacture, and durable.

Other objects and advantages of the invention will be apparent during the course of the following description.

In the accompanying drawings forming a part of this specification and in which like numerals are employed to designate like parts throughout the same, Figure 1 is a plan view of the appliance, Fig. 2 is a side view of the same, Fig. 3 is a detail horizontal section through the adjusting wedge and associated element, Fig. 4 is an enlarged section taken on line 4—4 of Fig. 1, Fig. 5 is a similar view taken on line 5—5 of Fig. 1, Fig. 6 is a bottom plan view of one holding-post showing a different form of instrument therein, and Fig. 7 is a fragmentary side view of the lower portion of the same.

The appliance is preferably formed of an integral strip 8, which is substantially Y-shaped. This Y-shaped strip or frame 8 is preferably formed of metal or other material having a desired degree of stiffness and resiliency. The Y-shaped frame includes handle portions 9 inclined to provide a wedge-shaped space 10 therebetween, which tapers toward the forward or free end of the frame. At the forward ends of the handle portions 9 are formed arms 11, which diverge toward their free ends and carry parallel longitudinal portions 12, as shown. The arms 11 are capable of having restricted movement toward and away from each other, as will be apparent hereinafter.

Disposed in the forward contracted portion of the opening 10, is an adjusting or spreading wedge 13, which is preferably thicker than the handle portions 9, which it slidably engages. This wedge is provided with a longitudinal opening 14, for receiving spaced guide pins 15, having their ends fitted in openings formed in the handle portions 9, as shown.

The end portions 12 are provided with openings 16, for receiving rotatable holding-post 17, carrying milled heads 18. The holding-posts are each provided near the head 18, with an annular groove 19, for receiving the inner end of a clamping-screw 20, carrying a milled head 21. This clamping-screw prevents the longitudinal displacement of the holding-post 17, permits its being turned, and is adapted to hold it against such turning.

Each of the holding-posts 17 is provided with a longitudinal slot or opening 22 and upon one side and near its free end with groove or grooves 23. The holding-posts 17 serve to detachably hold an instrument, such as a saw, strip of sand paper, an elastic band or the like. When the word "instrument" is employed in the claims it is to be taken in its broad sense, as covering all of the above named tools or devices and those which may be similarly used.

The numeral 24 designates an instrument, which in this instance is a saw, provided near its ends with transverse pins 25, to enter the grooves 23, while the saw fits in the openings 22.

The numeral 26 designates an instrument, which is a strip of sand paper, having its free ends passed through the openings 22, as shown. When this strip of sand paper is used the holding-posts 17 are turned so that the material of the strip will engage the free ends thereof to prevent the same from slipping.

For properly tensioning the instrument, the wedge 13 is moved forwardly longitudinally, whereby the arms 11 are spread.

It is to be understood that the form of my invention herewith shown and described is to be taken as a preferred example of the same and that certain changes in the size, shape, and arrangement of parts may be resorted to without departing from the spirit of my invention or the scope of the subjoined claims.

Having thus described my invention, I claim:—

1. A dental appliance, comprising an integral approximately Y-shaped frame including a resilient handle portion having relatively movable sides arranged to form a wedge-shaped opening therebetween, a wedge movably mounted within the contracted end of the wedge-shaped opening, a strip instrument, and means connecting the strip instrument with the free ends of the approximately Y-shaped frame.

2. A dental appliance, comprising an integral approximately Y-shaped frame including a resilient handle portion having relatively movable sides, means to move said sides away from each other, a strip instrument, and means connecting the strip instrument with the free ends of the approximately Y-shaped frame.

3. A dental appliance, comprising an integral substantially Y-shaped frame including a resilient handle portion having relatively movable sides arranged to form a wedge-shaped opening therebetween, a wedge mounted within the contracted end of the wedge-shaped opening, an instrument, and adjustable means connecting the instrument with the free ends of the substantially Y-shaped frame.

4. A dental appliance, comprising an approximately Y-shaped frame including a handle portion having oppositely disposed relatively movable sides arranged to form a wedge-shaped opening, a wedge movably mounted within such wedge-shaped opening in slidable engagement with said sides and provided with a longitudinal opening, guide element or elements connected with said sides and passing through the opening in the wedge, a strip instrument, and means to detachably connect the strip instrument with the ends of said approximately Y-shaped frame.

5. A dental appliance, comprising a suitably stiff and resilient frame including spaced arms, means to move the arms away from each other, holding-posts rotatably mounted through the spaced arms and provided with longitudinal openings near the ends thereof, means to turn the holding-posts, means to clamp the holding-posts in adjustment at different rotary positions, and a flexible strip instrument having its ends inserted within the longitudinal openings of the holding-posts.

In testimony whereof I affix my signature in presence of two witnesses.

FOREST O. KEIFER.

Witnesses:
 E. M. PINKERTON,
 W. H. ELMORE.